United States Patent [19]
Katchalski et al.

[11] 3,873,426
[45] Mar. 25, 1975

[54] INSOLUBLE ENZYMES

[75] Inventors: Ephraim Katchalski, Rehovot; Yehuda Levin, Tel-Aviv; Beka Solomon, Rehovot, all of Israel

[73] Assignee: Miles Laboratories, Elkhart, Ind.

[22] Filed: July 2, 1973

[21] Appl. No.: 375,601

[52] U.S. Cl.................. 195/63, 195/31 R, 195/68, 195/DIG. 11
[51] Int. Cl............................................... C07g 7/02
[58] Field of Search........ 195/63, 68, DIG. 11, 31 R

[56] References Cited
UNITED STATES PATENTS

| | | | |
|---|---|---|---|
| 2,121,459 | 6/1938 | Lentz et al............................ | 195/68 |
| 2,717,852 | 9/1955 | Stone...................... | 195/DIG. 11 X |
| 3,619,371 | 11/1971 | Crook et al.............. | 195/DIG. 11 X |

*Primary Examiner*—David M. Naff
*Attorney, Agent, or Firm*—Louis E. Davidson

[57] ABSTRACT

Water-insoluble enzymes wherein the enzyme is stably retained on an alumina carrier are prepared by adsorbing the enzyme and a dye on an activated alumina carrier at a pH below about 7.

7 Claims, No Drawings

INSOLUBLE ENZYMES

BACKGROUND AND PRIOR ART

Enzymes useful in various industrial processes, such as amyloglucosidase for conversion of starch to dextrose and amylase for liquefaction of starch, are water-soluble and are generally employed in either batch or continuous operations by mixing with an aqueous solution or slurry of the material being treated. At the conclusion of the desired reaction, the unused enzyme cannot be conveniently recovered for reuse. Since its continued presence in contact with the treated material can cause undesired continuation of the enzymatic reaction, techniques must be employed for inactivation of the enzyme. It has long been known that a water-insoluble form of enzyme which retains a high level of enzymatic activity would have decided commercial advantages. In either a batch or continuous operation the water-insoluble enzyme can be conveniently separated from the generally soluble reaction products. It can thus be reused, and the reaction products do not need to be treated to inactivate residual enzyme activity.

Various techniques have been suggested in the prior art for the production of insoluble forms of various enzymes and most of such techniques employ complex procedures. One technique suggested was to react a dichlorotriazine dye with cellulose under alkaline conditions to form a dye-cellulose reaction product and then to react an enzyme with this dye-cellulose product under alkaline conditions to produce an insoluble enzyme. This prior art production process had the disadvantage of requiring a complex reaction to take place between the dye and the cellulose, followed by a reaction between the dye and the enzyme.

SUMMARY OF THE INVENTION

In accordance with the present invention, an insoluble enzyme is provided consisting essentially of an enzyme adsorbed on activated alumina and stability by the presence of a dye. This insoluble enzyme is produced by a process which comprises adsorbing an enzyme and a dye on an activated alumina carrier at a pH below about 7.

DESCRIPTION OF THE INVENTION

The enzymes useful in the present invention are well-known materials and are produced in well-known procedures. Especially useful enzymes are amyloglucosidase, lactase, bacterial amylase and fungal amylase.

The dyes useful in the present invention are well-known and are commercially available. The preferred dyes are the halotriazine dyes. An especially preferred dye is available in the monoazo dichlorotriazine form under the tradename "Procion Brown MX5BR" marketed by Imperial Chemical Industries. This dye is identified in the Colour Index, Third Edition (1971) as C. I. Reactive Brown 10. Other suitable halotriazine dyes are listed in the Colour Index as C. I. Reactive Orange 1, C. I. Reactive Black 1 and C. I. Reactive Blue 4, for example.

The activated alumina useful in the present invention is well-known. It is generally obtained by dehydration and calcination of aluminum hydroxide at about 900°C. in a carbon dioxide atmosphere which tends to coat the resulting individual alumina particles with a thin layer of aluminum oxycarbonate having the approximate formula $[Al_2(OH)_5]_2 CO_3.H_2O$. Alternatively, commercially available alumina can be activated by washing with concentrated hydrochloric acid. It is necessary that the alumina be in an activated condition in order to properly adsorb the enzyme and the dye. While the mesh size of the alumina is not critical for the practice of the process of the present invention, it is preferred that the alumina have a mesh size between about 14 and about 48, as measured by the Tyler Standard Screen Scale. Insoluble enzymes having an alumina carrier in this size range have minimum flow resistance when employed in a column to treat liquid materials.

In carrying out the process of the present invention, the activated alumina is preferably contacted with an aqueous solution of the dye at a pH below about 7 and the dye is conveniently and rapidly adsorbed on the surfaces of the alumina particles. If the pH is above about 7, the amount of adsorption is minimal. Preferably the dye is contacted with the alumina at a pH from about 4 to about 5. The alumina is then washed with water to remove any unadsorbed dye. The dye-alumina carrier combination is then adjusted to a pH below about 7 by washing with appropriate buffer solution. The specific pH condition will depend upon the particular enzyme that is being insolubilized. Amyloglucosidase and lactase prefer a pH of about 4 to 4.5, fungal amylase prefers a pH of about 5, while bacterial amylase prefers a pH of about 6. The dye-alumina carrier is then contacted with an aqueous solution of the enzyme at the preferred pH condition to allow the enzyme to be adsorbed and retained by the alumina. Under these adsorption conditions below about pH 7, there is no covalent bonding resulting from chemical reaction between the dye and the enzyme that might otherwise take place at pH 7–9, for example. Even though there is no apparent chemical reaction between the dye and the enzyme, the presence of the dye stabilizes and improves the retention of enzyme activity on the alumina over the values obtained without the use of the dye. It is also understood that the enzyme can be adsorbed first by the alumina under the above pH conditions followed by adsorption of the dye at a pH below about 7.

In a modification of the present invention, the adsorbed enzyme can be further treated with glutaraldehyde to cross-link the enzyme and increase its insolubility without significantly decreasing its activity.

The insoluble enzymes produced by the process of the present invention retain a high amount of the original activity present in the enzymes prior to their insolubilization. These insoluble enzymes can be employed in a well-known manner to enzymatically treat other substances. At the conclusion of such treatment the insoluble enzymes can then be conveniently separated from the treated substances.

The methods employed for assaying the enzymatic activity in the starting material and in the insolubilized enzymes are described below.

Amyloglucosidase Activity

Amyloglucosidase is capable of catalyzing the alpha cleavage of p-nitrophenyl-$\alpha$-D-glucopyranoside to liberate one mole of glucose and one mole of p-nitrophenol per mole of the substrate. The absorbence of the liberated p-nitrophenol is then measured. This assay is highly specific for amyloglucosidase.

An acetate buffer is prepared by diluting 57 ml. of glacial acetic acid to 600 ml. in a 1 liter volumetric flask. The pH is then adjusted to 4.2 with 2N sodium hydroxide and brought to volume with distilled water. A buffered substrate is prepared by dissolving 100 mg. of p-nitrophenyl-α-D-glycopyranoside in 75 ml. of water. To this is then added 10 ml. of the above acetate buffer and the mixture is diluted to 100 ml. A sodium carbonate solution is prepared by dissolving 10 gm. of anhydrous sodium carbonate in 1 liter of distilled water in a volumetric flask.

In order to carry out the assay, place 9 ml. of the buffered substrate in a test tube, stopper the test tube and allow it to equilibrate at 60°C. in a water bath for 10 minutes. At zero time add 1 ml. of an enzyme solution to be assayed or a portion of the insolubilized enzyme suspended in 1 ml. of water to the test tube and incubate at 60°C. for exactly 15 minutes. Remove a 1 ml. aliquot portion from the test tube and add it to a test tube containing 9 ml. of the sodium carbonate solution. Measure the absorbence of this solution using a light source having a wavelength of 400 millimicrons. The enzyme being assayed should have a concentration such that the absorbence falls within the range from 0.1 to 0.8. A blank is prepared by adding 1 ml. of water to 9 ml. of substrate and repeating the above procedure. The amyloglucosidase activity is calculated from the formula:

$$A = (0.82)(OD)(D),$$

where
$A$ = amyloglucosidase activity, units per ml. of sample
$OD$ = absorbence of sample − absorbence of blank
$D$ = dilution of enzyme One unit of activity is the amount of enzyme which will liberate the equivalent of 1 gm. of glucose per hour under the conditions of the assay.

Lactase Activity

An acetate buffer is prepared by diluting 5.75 ml. of glacial acetic acid to 800 ml. in a 1 liter volumetric flask. The pH is adjusted to 4.0 with sodium hydroxide and brought to volume with distilled water. A buffered substrate is prepared by dissolving 250 mg. of o-nitrophenyl-β-D-galactopyranoside in 100 ml. of the acetate buffer. This buffered substrate should be stored under refrigeration when not being used. It should be discarded if it has a substrate blank absorbence above 0.1 versus distilled water. A sodium carbonate solution is prepared by dissolving 10 gm. of anhydrous sodium carbonate in 1 liter of distilled water in a volumetric flask.

In order to carry out the assay, place 2 ml. of the buffered substrate in a test tube and allow it to equilibrate at 60°C. in a water bath for 5 minutes. At zero time add 0.5 ml. of an enzyme solution to be assayed or a portion of the insolubilized enzyme suspended in 0.5 ml. of water to the test tube and incubate at 60°C. for exactly 15 minutes. Remove a 1 ml. aliquot portion from the test tube and add it to a test tube containing 9 ml. of the sodium carbonate solution. Measure the absorbence of this solution using a light source having a wavelength of 420 millimicrons. The enzyme being assayed should have a concentration such that the absorbence falls within the range from 0.1 to 0.6. A blank is prepared by adding 0.5 ml. of water to 2 ml. of substrate and repeating the above procedure. The lactase activity is calculated from the formula:

$$L = [(0.71634)(OD)]/D,$$

where
$L$ = lactase activity, units per ml. of sample
$OD$ = absorbence of sample − absorbence of blank
$D$ = dilution of enzyme.

One unit of activity is the amount of enzyme which will liberate 1 micromole of o-nitrophenol per minute under the conditions of the assay.

Alpha-Amylase Activity

An alpha-amylase unit is the enzyme activity indicated when, in the presence of an excess of beta-amylase, 1 gram of alpha-amylase will catalyze the hydrolysis of 1 gram of starch to dextrin in 1 hour under standard assay conditions. The standard assay conditions are 20 ml. of an aqueous substrate containing 0.4 gm. of soluble starch and 0.01 gm. of beta-amylase; pH 5.0; 30°C.; 10 ml. of an alpha-amylase solution of sufficient potency that it will catalyze the dextrinization of starch in about 8 to 20 minutes; and incubation time sufficient to achieve dextrin formation. Dextrin formation is determined when the enzyme-starch solution produces a desired standard color when contacted with iodine. The number of alpha-amylase units are calculated by the following formula:

Alpha-amylase units = $[0.4 \times 60]/[$Enzyme wt. (gm.) $\times$ dextrinization time (min.)$]$ The present invention will be further described in the following illustrative examples.

EXAMPLE 1

A 1 gm. quantity of activated alumina having a mesh from 80 to 200 commercially available from the Aluminum Company of America was treated with 5 mg. of Procion Brown MK5BR (a monoazo dichlorotriazine dye commercially available from Imperial Chemical Industries). After an hour stirring the complex was stirred three times with water and with 0.02 M acetate buffer at pH 4.2 until the washings were free of color. This carrier was then suspended in 5 ml. of 0.02 M acetate buffer at pH 4.2 and 50 mg. of amyloglucosidase were added with stirring, and stirring was continued for 1 hour at room temperature. The alumina particles were then separated from the supernatant liquid. No amyloglucosidase activity was found in the supernatant liquid. The alumina was assayed to contain about 80–100 percent of the amyloglucosidase activity initially added. The resulting insolubilized amyloglucosidase can be used for its enzymatic activity and can be conveniently recovered after such use.

EXAMPLE 2

A 1 gm. quantity of alumina having a mesh from 60 to 100 was activated by washing it with 4 M HCl followed by washing with 0.02 M acetate buffer at pH 4.2. It was then suspended in 0.1 M acetate buffer at pH 5 and was contacted with Procion Brown MX5BR dye for about 20 min. The dyed alumina was then washed with 0.02 M acetate buffer to pH 4.2 and was mixed with 5 ml. of an aqueous solution of amyloglucosidase containing 4.5 amyloglucosidase units, allowed to remain in contact with mixing overnight, and then separated from the liquid. The resulting insolubilized amyloglucosidase adsorbed stably on alumina contained 89 percent of the initial amyloglucosidase activity.

EXAMPLE 3

The procedure of Example 2 was repeated with alumina having a mesh from 14 to 28. The resulting insolubilized amyloglucosidase contained 77 percent of the initial amyloglucosidase activity while the enzyme activity in the supernatant liquid increased as compared to Example 2. This is explained by the fact that the larger sized alumina employed in this example contains a smaller overall surface area per unit weight than the alumina of Example 2. The total amount of adsorbed dye and adsorbed enzyme is thus reduced causing a reduction in retained amyloglucosidase activity.

EXAMPLE 4

The procedure of Example 2 was repeated using an enzyme solution containing lactase activity. The resulting insolubilized lactase contained 7.6 lactase units which was a significant amount of the initial activity.

EXAMPLE 5

A 0.5 gm. quantity of alumina having a mesh from 60 to 100 was activated by washing it with 4 M HCl followed by washing with water and then with 0.1 M acetate buffer at pH 4.2. It was then contacted with 5 ml. of 0.02 M acetate buffer at pH 4.2 containing 1 mg. of Procion Brown MX5BR dye for 20 min. with shaking. The resulting dyed alumina was then washed with water and then with 0.1 M acetate buffer to achieve a pH of 6.0. The dyed alumina was then contacted with agitation overnight with an aqueous solution of bacterial alpha-amylase obtained from *Bacillus subtilis*. The resulting insolubilized amylase was separated from the supernatant liquid and was assayed to contain about 94 percent of the initial enzyme activity. This insoluble enzyme was then used to catalyze the hydrolysis of starch syrup to dextrins.

EXAMPLE 6

The procedure of Example 5 was repeated using fungal alpha-amylase obtained from *Aspergillus oryzae*. The dye-alumina carrier had a pH of 5 at the time of the adsorption of the enzyme. The resulting insolubilized amylase contained a significant amount of the initial enzyme activity and was used to catalyze the hydrolysis of starch syrup to dextrins.

EXAMPLE 7

An insolubilized amyloglucosidase prepared in accordance with Example 1 was mixed with 5 ml. of 1 weight percent aqueous glutaraldehyde in 0.02 M sodium acetate buffer (pH 4.2) per gram of alumina. The resulting glutaraldehyde-treated insolubilized enzyme can have operational stability of retained enzyme about 20 percent longer than insolubilized enzyme which had not been treated with the glutaraldehyde.

Additional utility for the novel insolubilized enzyme produced in accordance with the present invention is shown in the following example.

EXAMPLE 8

A small glass column was packed with 27 gm. of amyloglucosidase insolubilized on dyed alumina according to the procedure of Example 2. This contained 4 amyloglucosidase units per gram. The column was submerged in a water bath at 50°C. A starch syrup having a Dextrose Equivalent of 15 was mixed with water in a concentration of 30 percent (weight/volume basis). This aqueous starch syrup was adjusted to pH 4.2 with HCl and was filtered. It was then passed through the insolubilized enzyme bed for a total contact time between the bed and syrup of about 25–26 min. The syrup was then separated from the bed and was analyzed for dextrose. There was a 78.5 percent conversion of the starch syrup to dextrose.

What is claimed is:

1. A process for insolubilizing enzymes which comprises adsorbing an enzyme selected from the class consisting of amyloglucosidase, lactase, bacterial amylase and fungal amylase and a halotriazine dye on an activated alumina carrier at a pH below about 7 to produce an insolubilized enzyme which retains significant amounts of desired enzyme activity.

2. A process according to claim 1 wherein the dye is adsorbed on the activated alumina followed by the adsorption of the enzyme.

3. A process according to claim 1 wherein the enzyme is adsorbed on the activated alumina followed by the adsorption of the dye.

4. A process according to claim 1 wherein the alumina has a mesh size between about 14 and about 48.

5. A process according to claim 1 wherein the insolubilized enzyme is further treated with glutaraldehyde.

6. A process according to claim 1 wherein the dye is a monoazo dichlorotriazine dye.

7. An insoluble enzyme produced in accordance with the process of claim 1.

* * * * *